United States Patent Office 3,219,204
Patented Nov. 23, 1965

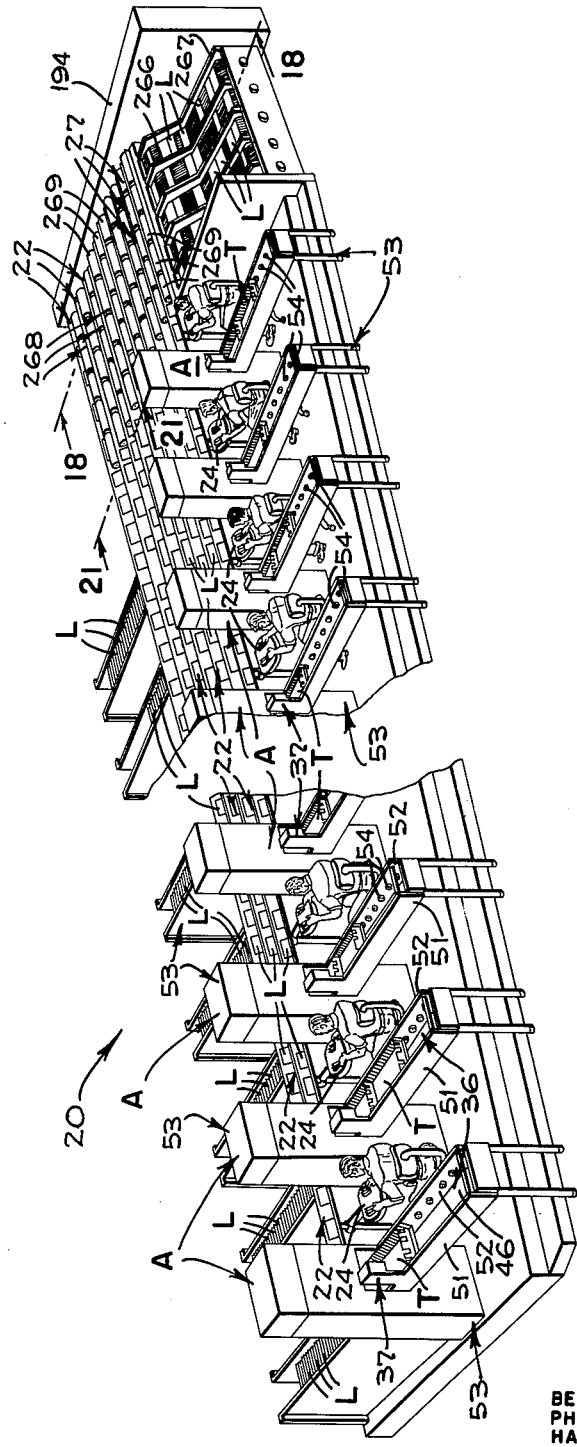

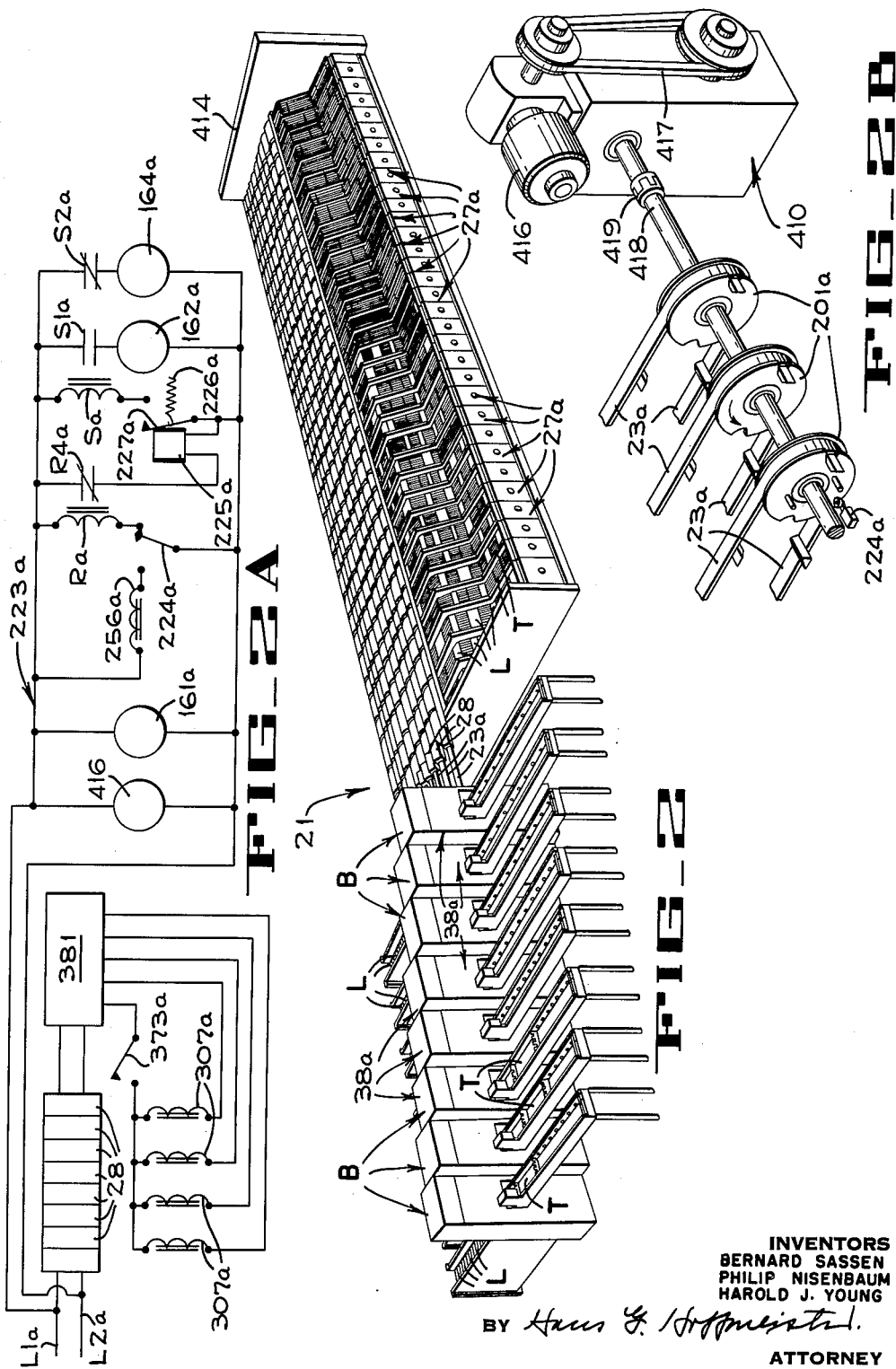

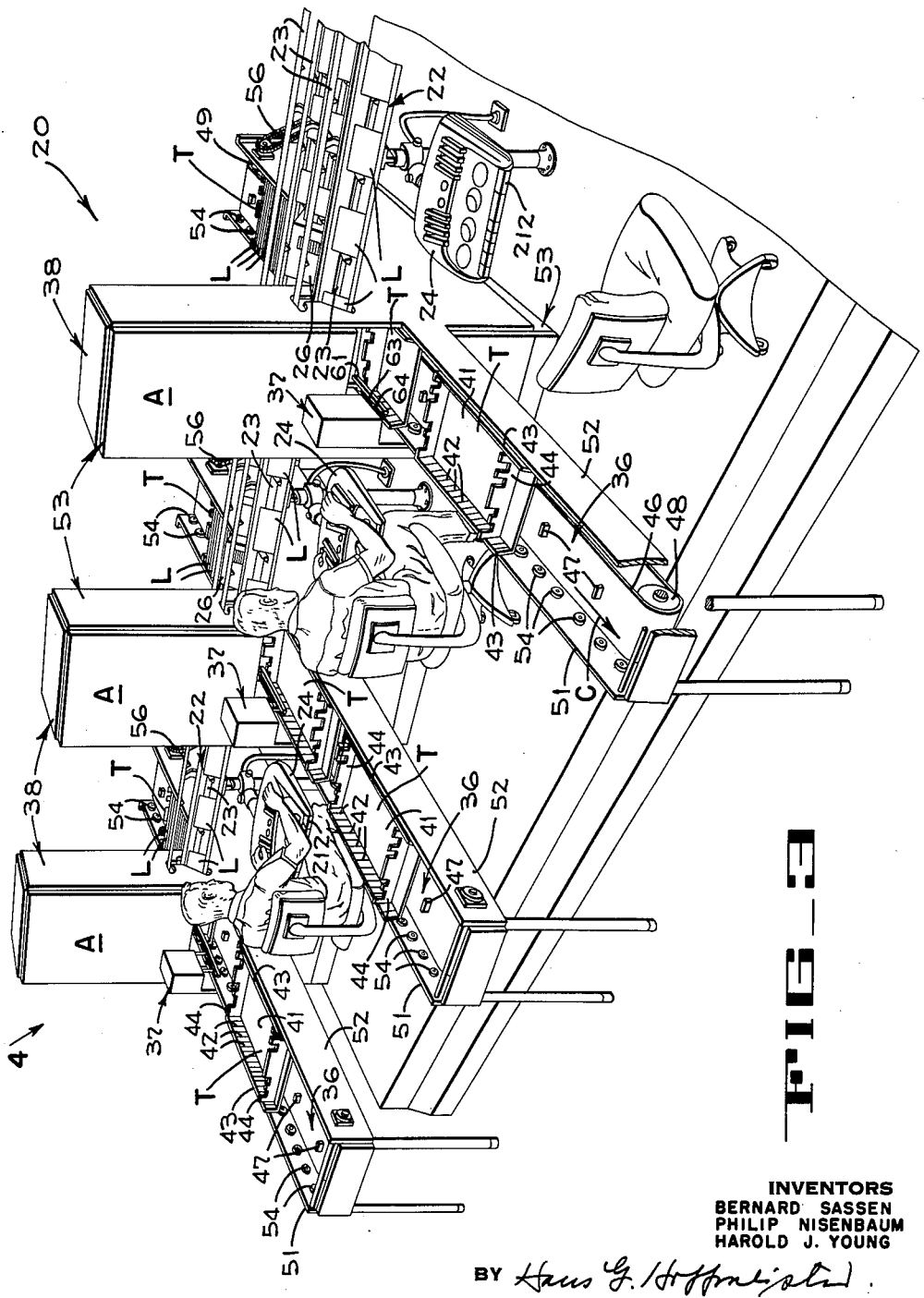
FIG_3

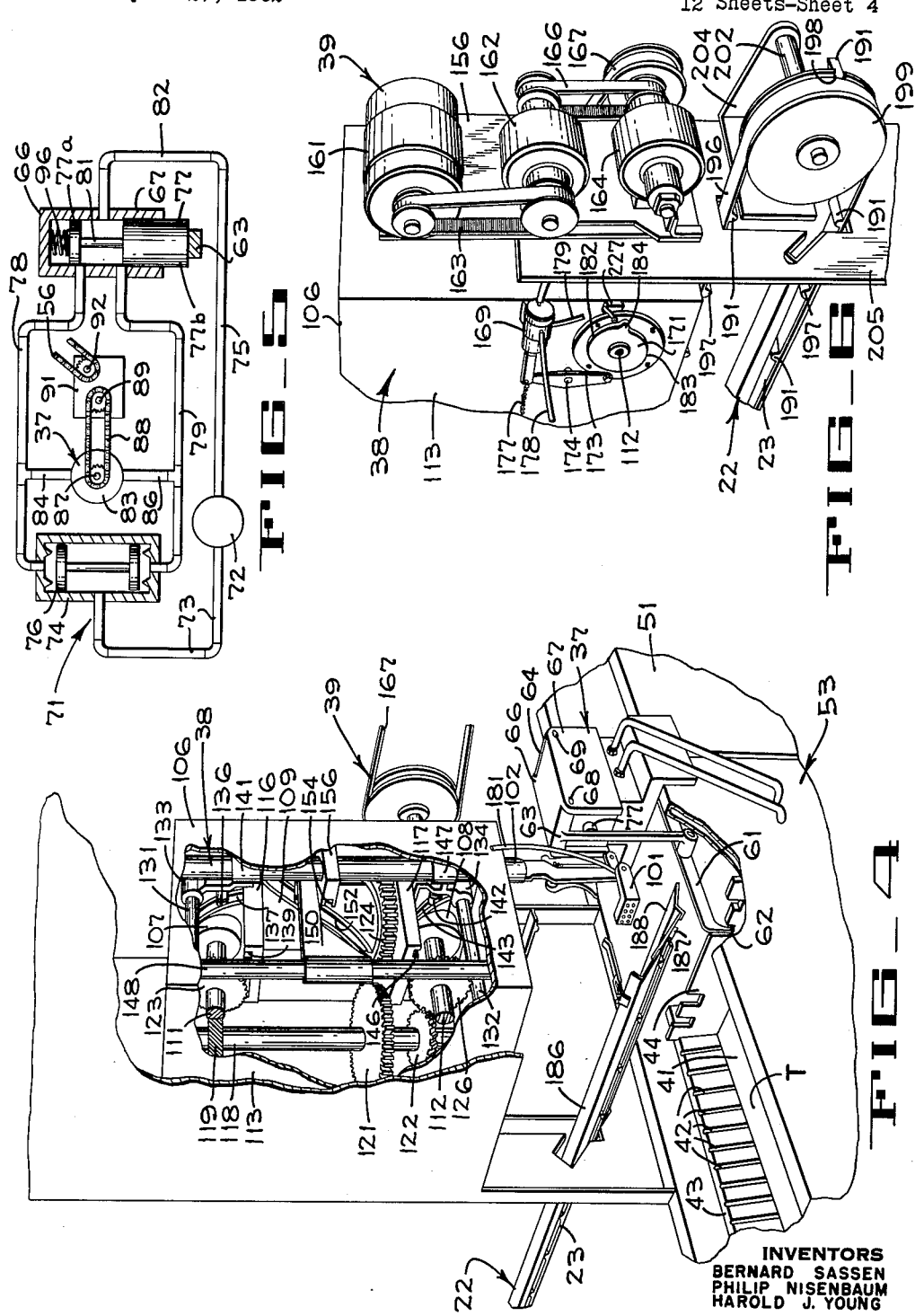

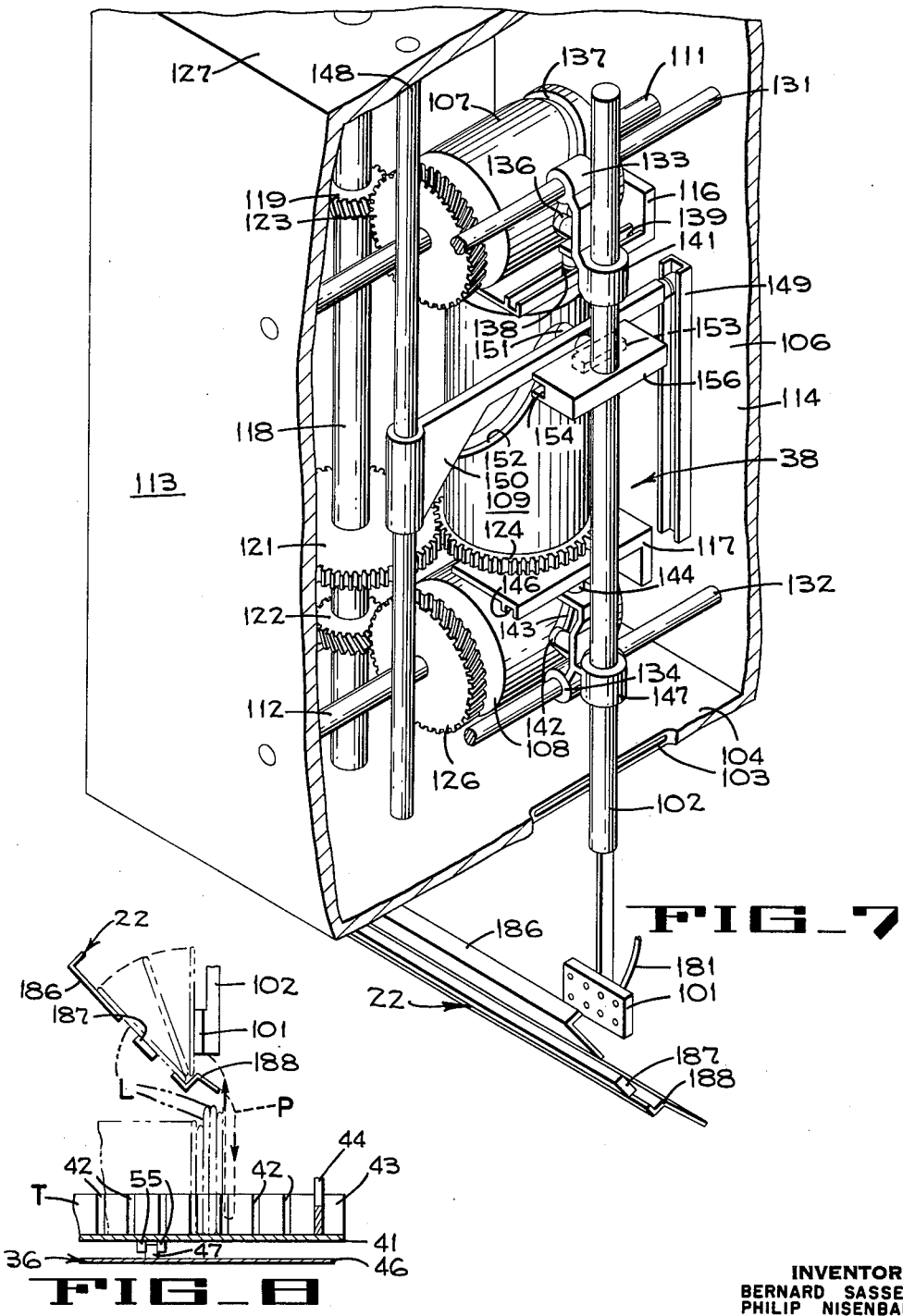

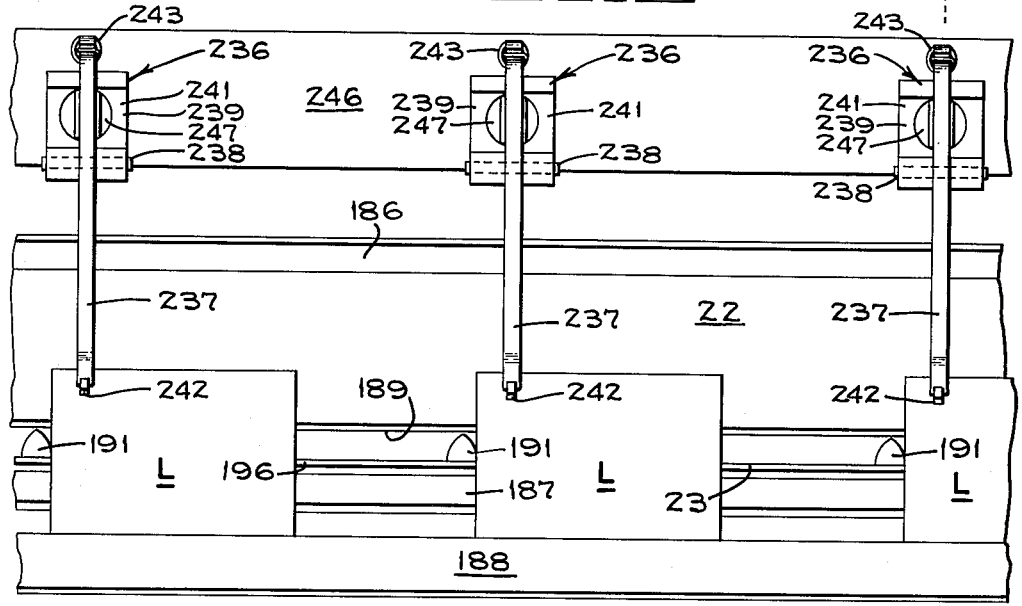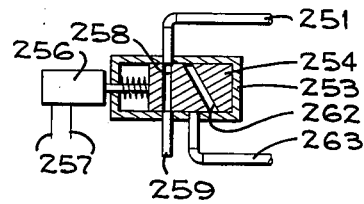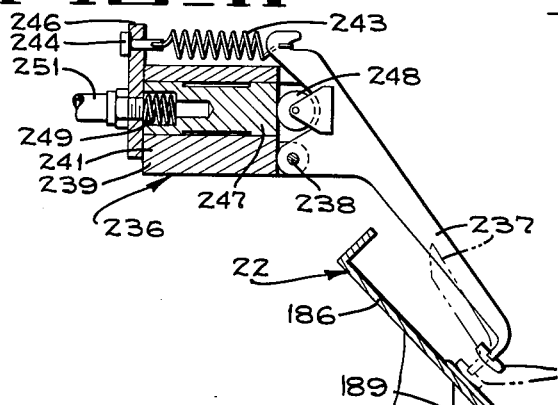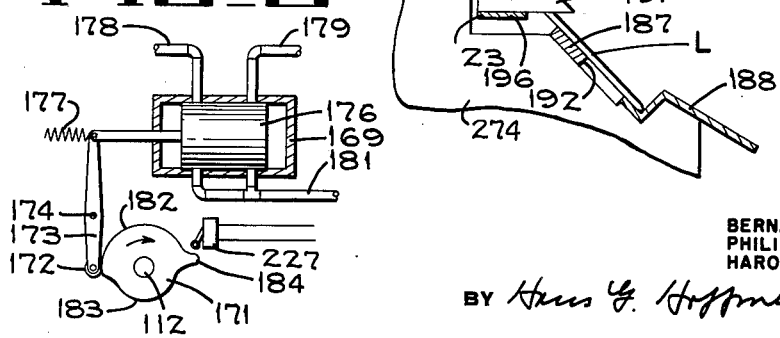

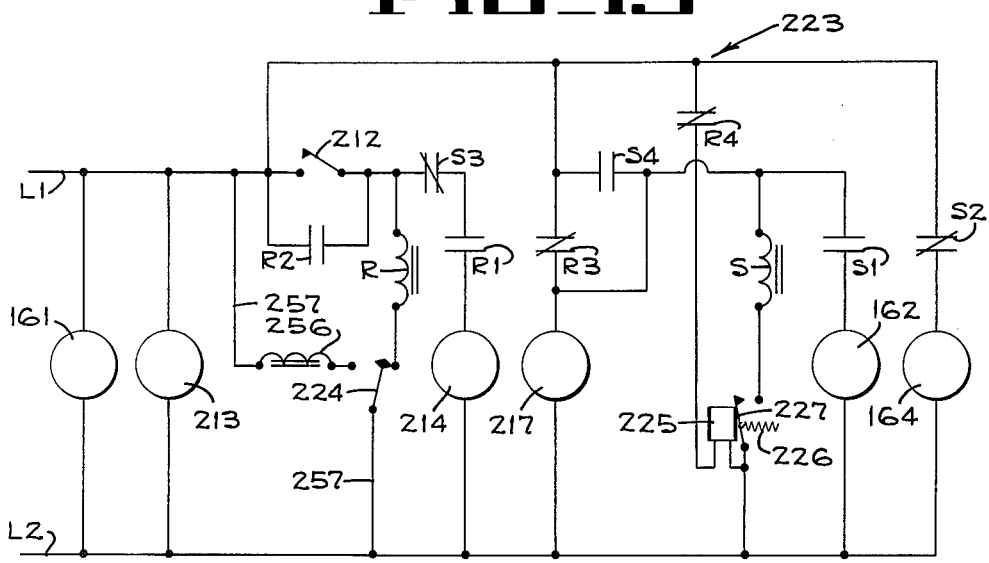
FIG_13
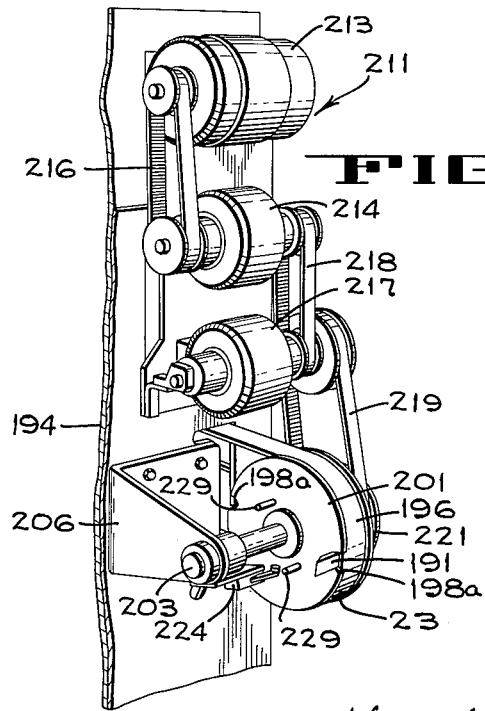
FIG_12

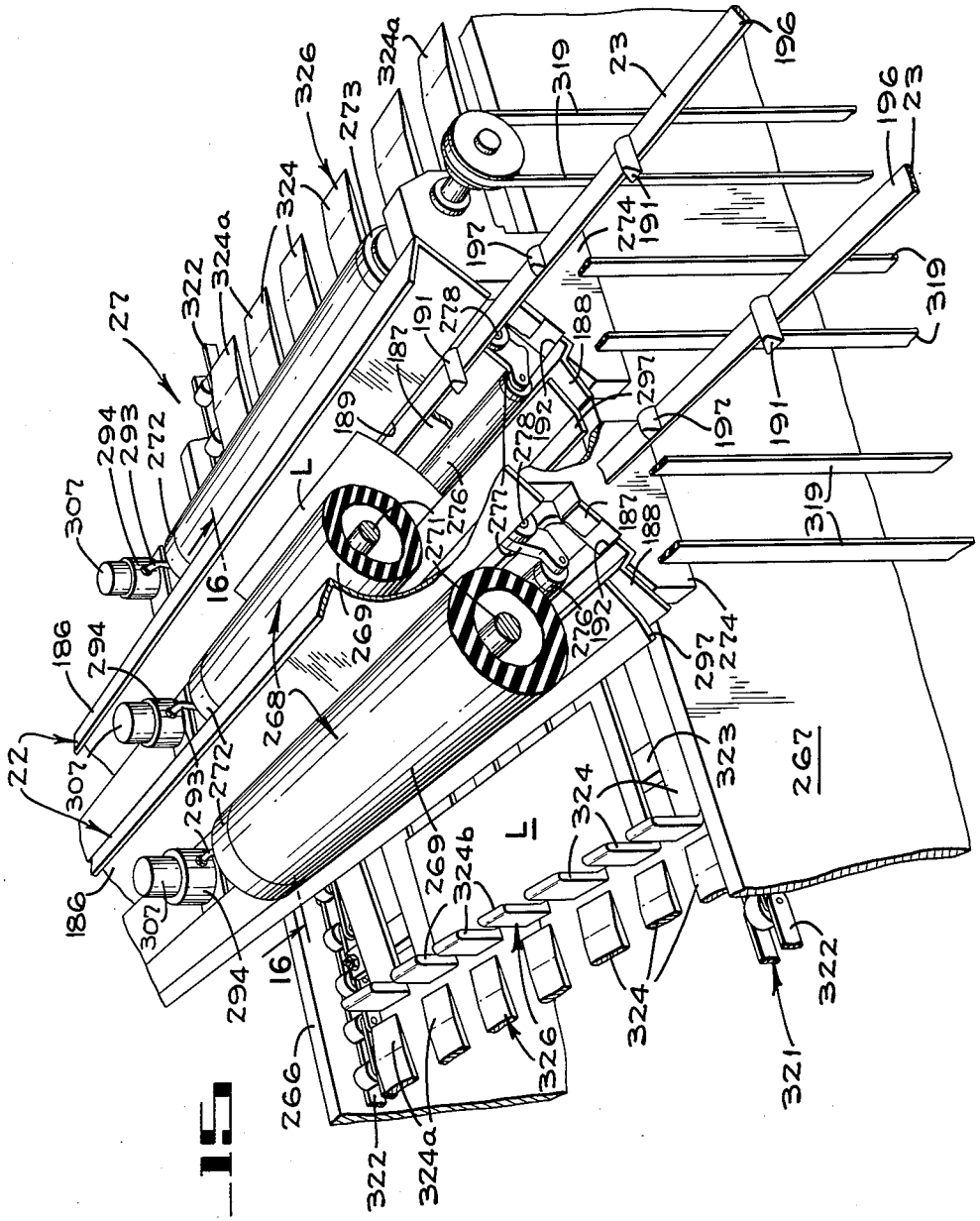
FIG_15

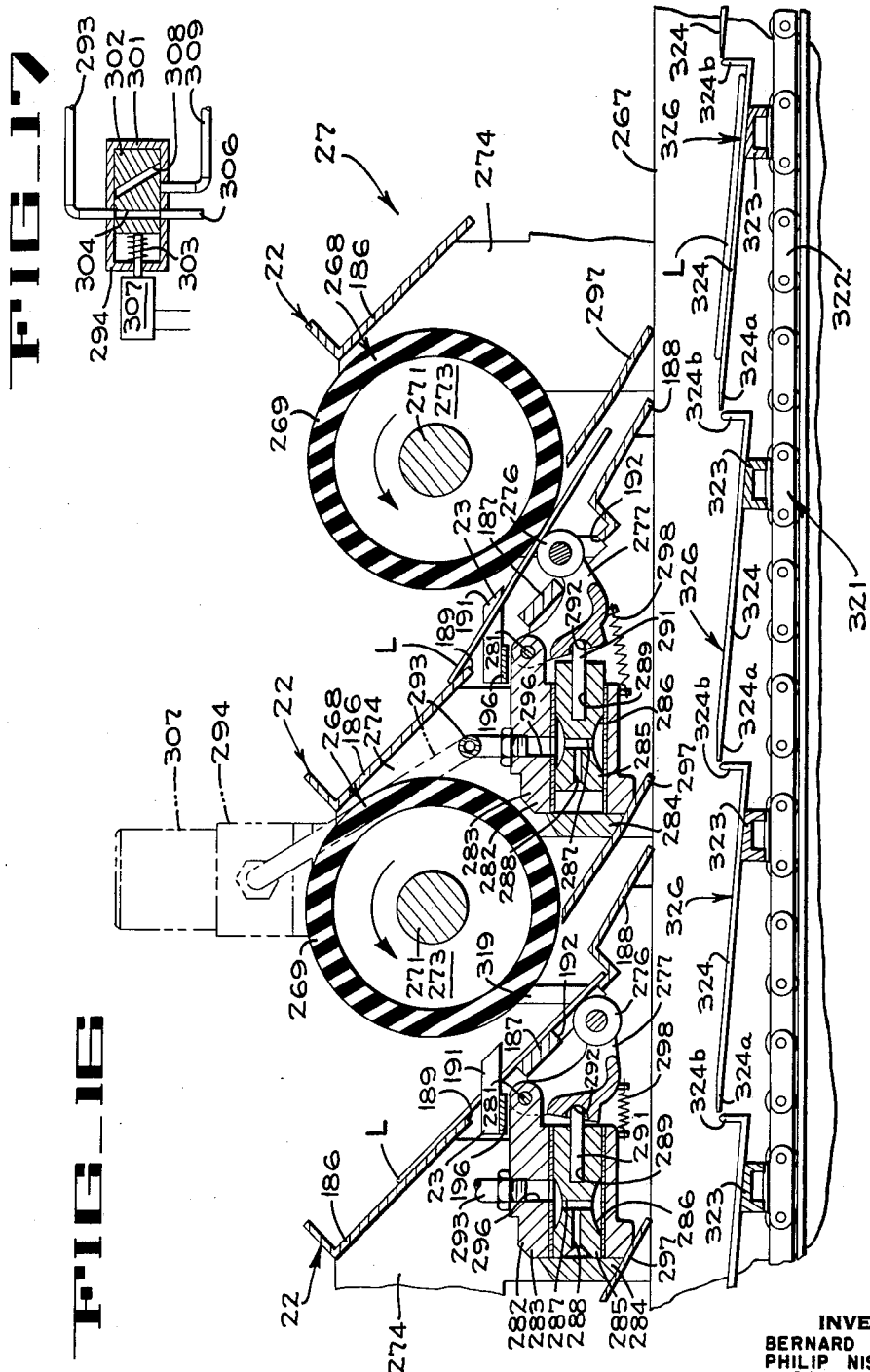

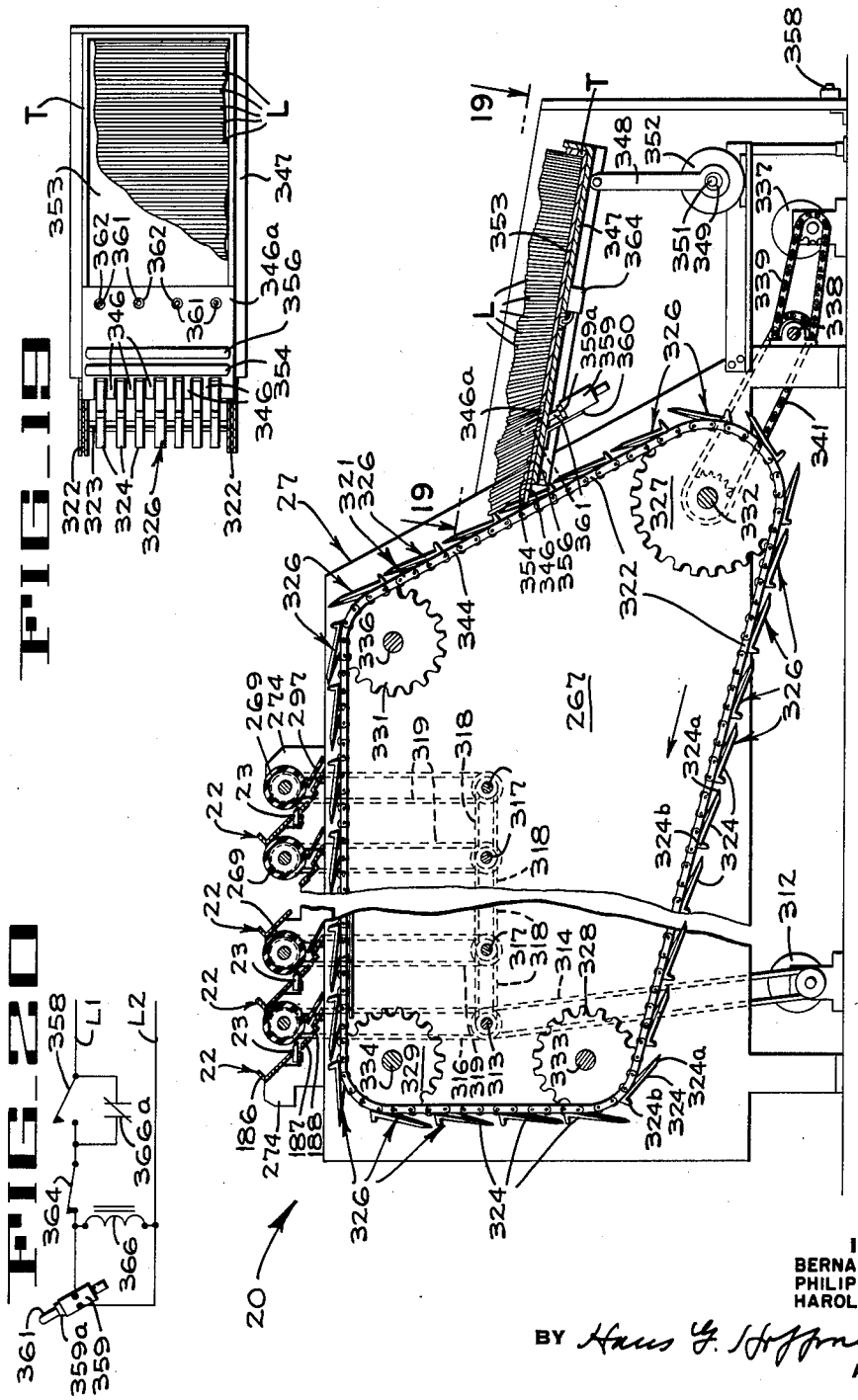

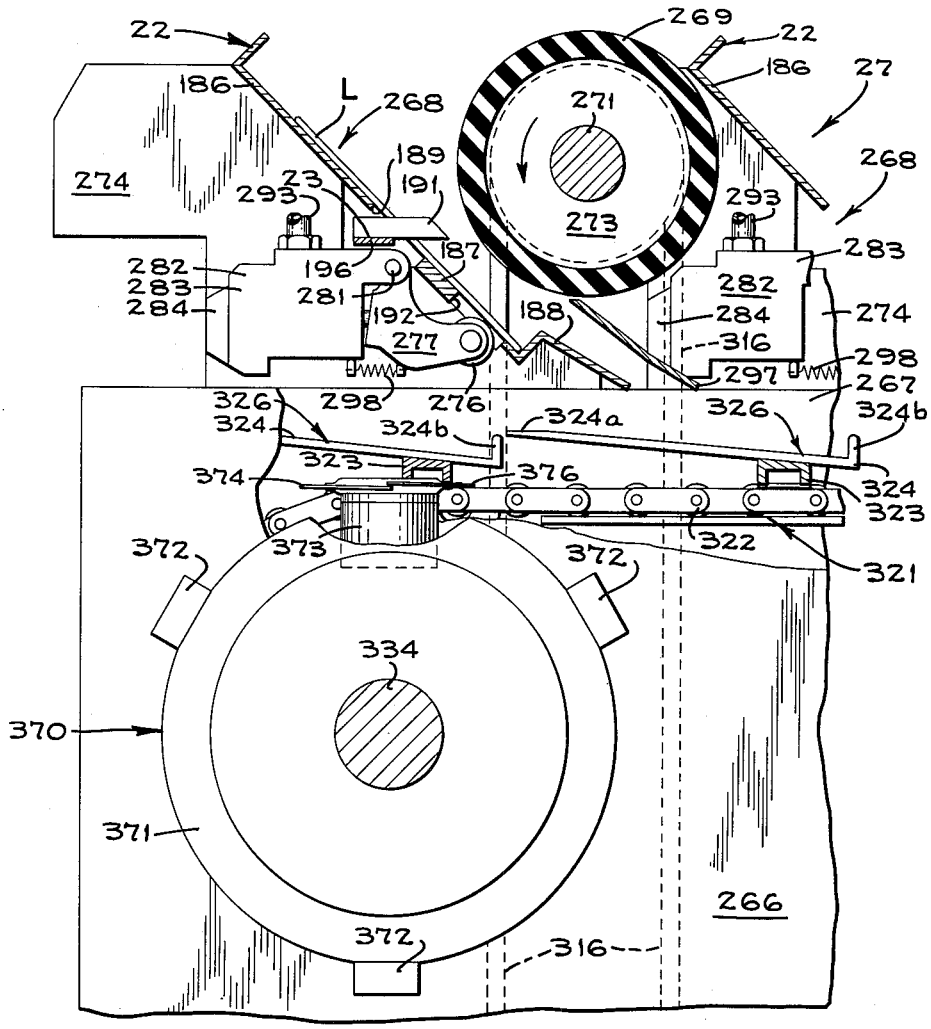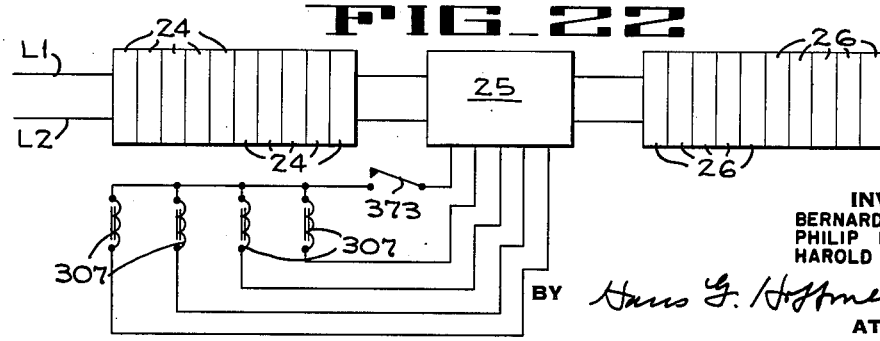

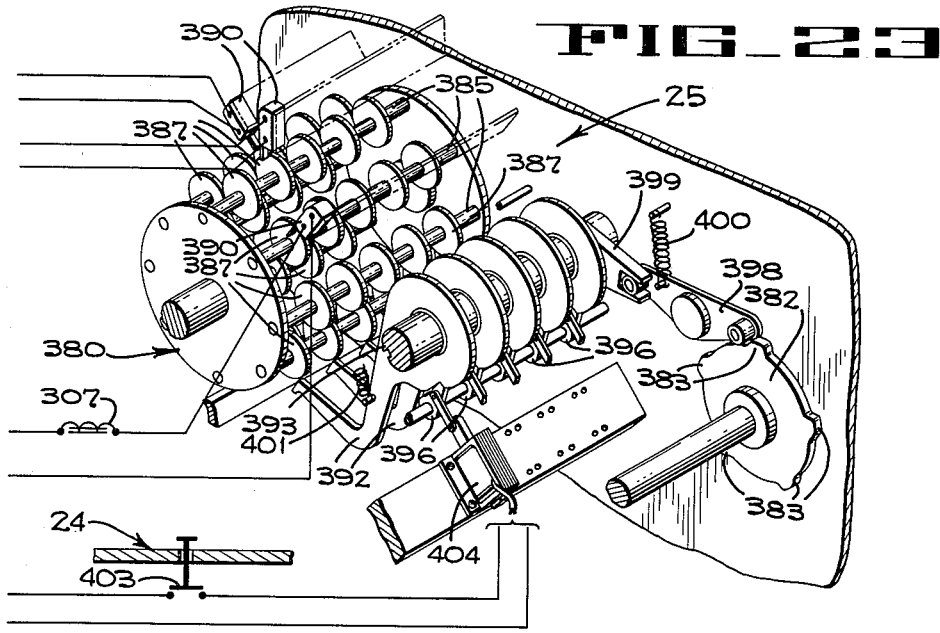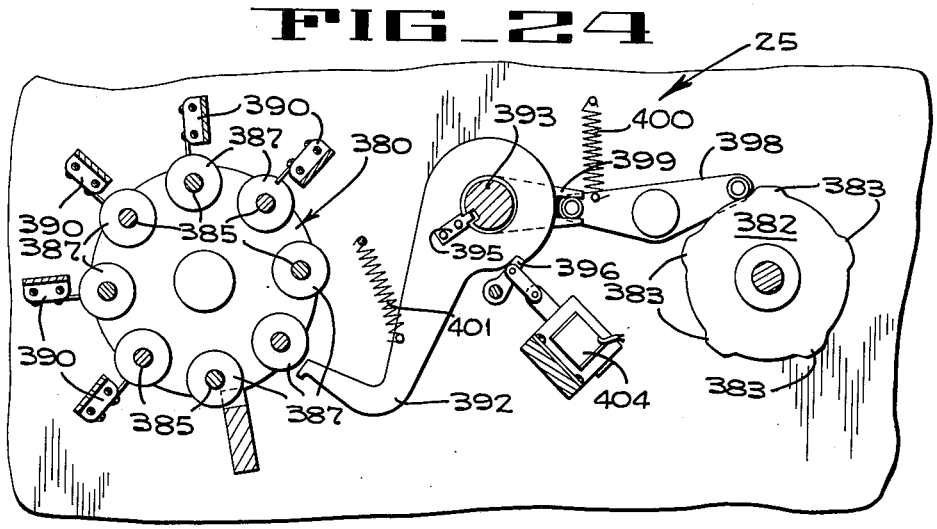

3,219,204
APPARATUS FOR HANDLING ARTICLES
Bernard Sassen, Los Gatos, and Philip Nisenbaum and Harold J. Young, San Jose, Calif., assignors to FMC Corporation, San Jose, Calif., a corporation of Delaware
Filed Apr. 27, 1962, Ser. No. 190,550
3 Claims. (Cl. 214—11)

The present invention pertains to a system for handling letters or the like and more particularly relates to a method of and apparatus for sorting letters into a plurality of separate classifications.

In large cities letter mail must be sorted into many different categories to assure that the letters will reach their proper destinations. To accomplish this sorting in a reasonable time, many operators have been required to read the address on the letters and to effect the sorting either manually or with the aid of mechanical sorting machines which operate in response to coded destination signals sent to the machine by the operator.

Heretofore, either individual sorting machines were provided for each operator, or machines were provided for a multiplicity of operators and the speed of the machine was set for the slowest operator so that excessive errors would not be made. Accordingly, the other operators were required to work at somewhat less than their optimum speed.

It is, therefore, one object of the present invention to provide letter handling apparatus arranged to sort letters into a plurality of separate classifications in response to coding signals entered into the apparatus by a plurality of operators, with each operator reading and coding at his own individual speed while the coded letters are deposited into classification trays which are common to all the operators.

Another object is to provide an improved letter sorting apparatus.

Another object is to provide a letter handling system for marking a destination code on letters and for discharging the coded letters into one of a plurality of trays in accordance with the code marked thereon.

Another object is to provide a letter handling apparatus arranged to receive letters in trays and to individually transport and discharge each letter into one of a plurality of destination trays in response to signals fed to the apparatus by one of a plurality of operators.

Another object is to provide an improved operator-paced apparatus for distributing letters of any conventional size received from trays into predetermined destination trays in response to signals entered into the apparatus by the operators.

Another object is to provide an improved mechanism for singulating letters.

Another object is to provide an improved drive mechanism for advancing trays of letters in letter thickness increments to a letter singulator.

Another object is to provide an improved high speed intermittently driven letter transporting conveyor arranged to handle letters of any conventional size.

Another object is to provide a letter arresting device associated with an intermittently driven high speed conveyor to arrest the movement of the letters simultaneously with the termination of movement of the conveyor.

Another object is to provide an automatic letter transfer and stacking mechanism.

Another object is to provide an improved transfer device for transferring letters from a transporting conveyor to a continuously driven stacking conveyor.

Another object is to provide a timing device for timing the actuation of the transfer device with the movement of the stacking conveyor.

Another object is to provide an improved method of automatically sorting coded letters into one of a plurality of destination trays in accordance with the code markings on the letters.

These and other objects and advantages of the present invention will become apparent from the following description and the accompanying drawings, in which:

FIG. 1 is a fragmentary diagrammatic perspective of a reading, coding and presorting apparatus of the letter handling system of the present invention, certain parts being removed.

FIG. 2 is a diagrammatic perspective of a decoding and letter sorting apparatus of the letter handling system which is arranged to receive letters from the machine of FIG. 1 and sort and stack the coded letters into one of a plurality of discharge stations in accordance with the code on the letter, certain parts being removed.

FIG. 2A is a portion of a circuit for controlling the apparatus disclosed in FIGURE 2.

FIG. 2B is an enlarged diagrammatic perspective showing the drive mechanism for the letter transporting conveyors.

FIG. 3 is an enlarged, fragmentary, diagrammatic perspective showing the left end of the coding and presorting apparatus of FIG. 1 in greater detail.

FIG. 4 is an enlarged fragmentary diagrammatic perspective looking in the direction of arrow 4 of FIG. 3 showing a portion of a tray feed conveyor and the letter singulator, certain parts being broken away and parts of the drive mechanism removed.

FIG. 5 is a schematic diagram of the hydraulic circuit of a tray feed conveyor drive unit.

FIG. 6 is a fragmentary diagrammatic perspective of the drive mechanism for the letter transporting conveyor of the reading, coding and presorting apparatus.

FIG. 7 is an enlarged diagrammatic perspective of the drive mechanism of the letter singulator.

FIG. 8 is a schematic section showing the path of movement of the vacuum operated letter pick-up head shown in FIG. 7.

FIG. 9 is a schematic section of an air-vacuum control system.

FIG. 10 is a schematic front elevation of a fragment of the reading, coding and presorting appartus showing several letter-arresting devices associated with one of the letter transporting conveyors.

FIG. 11 is a section taken along line 11—11 of FIG. 10 showing one of the letter arresting devices.

FIG. 12 is a perspective showing one of the drive mechanisms for the letter transporting conveyors.

FIG. 13 is a wiring diagram for the drive mechanism of one of the letter transporting conveyors and singulators.

FIG. 14 is a schematic section of a solenoid operated valve for controlling the latter arresting devices.

FIG. 15 is an enlarged perspective of a fragment of the letter transfer device, certain parts being cut away and other parts being shown in section.

FIG. 16 is an enlarged schematic section taken along line 16—16 of FIG. 15.

FIG. 17 is a schematic section of a solenoid operated valve for controlling the kick-off roller of one of the kick-off devices.

FIG. 18 is a schematic vertical section taken through line 18—18 of FIG. 1 showing one of the letter transfer and stacking mechanisms.

FIG. 19 is a schematic plan of a portion of the letter transfer and stacking mechanism looking in the direction of the arrow 19—19 of FIG. 18.

FIG. 20 is a wiring diagram of a circuit for controlling the portion of the letter transfer and stacking mechanism shown in FIGURE 19.

FIG. 21 is an enlarged schematic vertical section taken substantially along the line 21—21 of FIG. 1 showing the upper left portion of the letter stacking and transfer mechanism of FIG. 18 with a timing device associated therewith.

FIG. 22 is a diagram illustrating the operation of the timing device shown in FIGURE 21 and its association with other parts of the reading, coding and presorting apparatus.

FIG. 23 is a schematic diagram of the mechanical and electrical components of the memory unit used in the machine of FIG. 1, portion of the mechanism and circuits being broken away.

FIG. 24 is an enlarged diagrammatic end elevation, with parts in section, a portion of the unit of FIG. 23.

In general, the letter handling system of the present invention includes a reading, coding, and presorting apparatus 20 (FIG. 1), and a decoding and letter sorting apparatus 21 (FIG. 2) which is adapted to receive mail that has been processed in apparatus 20.

The reading, coding and presorting apparatus 20 (FIGS. 1 and 3) includes a plurality of coding stations A, ten stations being provided in the preferred embodiment of the invention. Trays T of letters L are fed into each coding station A and the letters are automatically placed one at a time on an inclined easel 22, there being one easel associated with each station and extending from that station to the discharge end of the machine. An operator at each station A reads the address on the letters L as they are moved along the easel 22 by a letter transporting conveyor 23 associated with that particular station. The operator controls a keyboard 24 (FIG. 3) that causes a coded marking to be imprinted on each letter by a printing unit 26, and also causes a signal to be placed into an electronic directory and memory unit 25 (illustrated diagramatically in FIG. 22) which effects a presorting of each letter causing the letters to subsequently be placed into one of a plurality, preferably five, of letter transfer and stacking mechanisms 27. In an exemplary system, the printing unit 26 may apply a code that will indicate that the letter belongs to one of a plurality of classifications such as required in city carrier delivery. One of the high speed, intermittently driven letter-transporting conveyors 23 is associated with each coding station A, and extends from that particular station to the mechanisms 27, and each conveyor 23 is intermitttently indexed at intervals determined by the operator associated with that station to advance each letter along the easel 22 to the particular mechanism 27 handling the class of mail to which the letter belongs. Each letter transfer and stacking mechanism 27 automatically discharges and stacks its presorted group of letters into trays which are removed from the machine by other operators.

The keyboard 24 and printing units 26 may be of the types disclosed in the U.S. Patent to Rabinow, No. 2,912,925 for Code Printing and Sorting Station for Mail, dated November 17, 1959 and Rabinow Patent No. 2,901,969 for Differential Pressure Envelope Printer, dated September 1, 1959. The Rabinow patents discloses a keyboard operated printed adapted to print a code on the back of the letter in the form of dots which can be read by photoelectric means.

The trays of letters from each presorted group which requires additional sorting, as for instance, in-town regular mail which must be sorted according to carrier routes and according to house-to-house sequence in the carrier route, are transferred as a group to any one of a plurality, preferably eight, of decoding stations B of the decoding and letter sorting apparatus 21 (FIG. 2). The decoding stations B includes the same components as the coding stations A except that the keyboard 24 and printing unit 26 are replaced by a decoding unit 28 (FIGS. 2 and 2A) which is associated with the memory device (not shown). An easel, which is not shown but is identical in construction to the easels 22 of unit 20, and a transportation conveyor 23a (FIG. 2B) are associated with each decoding station B and function in the same way as the easel 22 and conveyor 23 of the reading, coding, and presorting apparatus 20 except that the conveyors 23a are not operator-paced and are all intermittently driven at the same speed. The conveyor 23a delivers the letters to one of a plurality, preferably sixty-four, of letter transfer and stacking mechanisms 27a in accordance with the coded information printed on the letters. The mechanisms 27a are identical to the mechanisms 27 of the reading, coding and presorting apparatus 20.

If additional sorting of the letters is required after the first pass through the decoding and letter sorting apparatus 21, each sorted group may again be passed through the apparatus 21. This procedure may be repeated until the sorting is completed. Normally not more than three passes through the preferred embodiment of the apparatus 21 is required to separate the letters into the desired number of groups. It will be recognized that one pass through the reading, coding and presorting apparatus 20 will sort the letters into five groups, and that after these letters have passed through the decoding and letter sorting apparatus 21 three times, the letters will be divided into 1,310,720 groups. Thus, in most large cities the outgoing mail can be separated from in-town mail and sorted into the proper number of categories such as air mail, regular mail, special delivery, and the like, in one pass while the mail to be delivered within the city can be processed for complete house-to-house delivery sequence sorting with not more than three passes through the decoding and letter sorting apparatus 21.

More particularly, the reading, coding and presorting apparatus 20 (FIG. 3) includes, at each coding station A, a tray conveyor 36, an incremental drive mechanism 37 (FIGS. 4 and 5) for advancing the tray conveyor 36 in increments equal to the thickness of the letters being removed therefrom, and a letter singulator 38 and its drive mechanism 39 (FIG. 6).

All of the stations A are identical, therefore, the description of one will suffice for all. It will be evident, of course, that the easels 22 and conveyors 23 associated with the stations A are of different length and are disposed in spaced parallel relationship. Also, it will be noted that there is only one conveyor passing the coding station A at the left of the machine in FIG. 1, and that as the number of conveyors passing through each station increases, the last station A receiving ten conveyors. Accordingly, although each station is equipped in the same manner, the stations become progressively longer as view from left to right (FIG. 1).

As best shown in FIGS. 3 and 4, each tray T comprises an open-ended generally U-shaped body 41 having a plurality of vertical grooves 42 in each vertical side wall 43. Two removable end plates 44 are each placed in aligned grooves 42 in the walls 43 and are spaced apart a distance sufficient to support the letters thereon in substantially vertical planes parallel to the end plates 44. The letters, which may be of any standard size, are cancelled and placed upright in the trays T with the addresses facing the operator so that they can be read by the operator.

The tray conveyor 36 (FIG. 3) comprises an endless steel band 46 having a plurality of evenly spaced upstanding lugs 47 thereon. The band 46 is trained around end rolls 48 and 49 which are journalled in parallel spaced side plates 51 and 52 of the frame 53 of the associated station. The trays T are supported by a plurality of rollers 54 projecting inwardly from the opposed side plates 51 and 52. Each filled tray T is placed on the rollers 54 by an operator with at least one of the lugs 47 fitted in a slot (FIG. 8) formed between a pair of depending lugs 55 on the underside of the tray T so that the tray can be moved toward or away from the operator in response to similar movement of the steel band 46. The upper run of the steel band 46 is normally driven in the direction of the arrow C (FIG. 3) by the incremental drive mechanism 37 (FIG. 3) which includes a chain drive 56 conected to the roller 49.

The incremental drive mechanism 37 for each tray conveyor 36 includes a sensing finger 61 (FIG. 4) which extends through a slot 62 in the end plate 44 of the tray being emptied and abuts the foremost letter therein. The sensing finger 61 is pivotally supported by identical parallel bars 63 and 64 which are pivoted to a housing 66 of a servo valve 67 by pins 68 and 69, respectively.

The servo valve 67 is connected in a closed hydraulic circuit 71 (FIG. 5) which includes a continuously driven pump 72 that forces hydraulic fluid through a conduit 73 to a differential flow divider 74 having a flow controlling spool 76 therein. When the valve core 77 of the servo valve 67 is in the central position shown in FIG. 5, equal amounts of fluid flow past the ends of the spool 76 and out of both ends of the flow divider 74 through conduits 78 and 79 respectively. The flow of hydraulic fluid continues past a reduced diameter portion 81 of the valve-core 77 and returns to the pump 72 through a conduit 82. A hydraulic drive motor 83 is connected in parallel between the conduits 78 and 79 by branch conduits 84 and 86, respectively. It will be recognized that as long as the valve core 77 remains centered in the position shown in FIG. 5, fluid will not flow through the motor 83 and accordingly its drive shaft 87 will not rotate. The drive shaft 87 is connected by a chain drive 88 to the input shaft 89 of a gear reducer 91. The output shaft 92 of the gear reducer 91 is connected by the aforementioned chain drive 56 to the roller 49 (FIG. 3) of the associated tray conveyor 36.

A compression spring 96 urges the valve core 77 outwardly against the bar 63 which carries the sensing finger 61. The spring 96 is very weak and can be overcome by a force of approximately two to four ounces acting on the finger 61. When a letter is not being contacted by the finger 61, the spring 96 will urge the valve-core 77 downwardly as viewed in FIG. 5 until the flow through the conduit 78 is blocked by a portion 77a of the core 77 and the conduit 79 is completely opened. The pressure in conduit 79 is thus lower than the pressure in conduit 78 and, accordingly, the spool 76 of the flow-divider 74 is moved downwardly (FIG. 5) causing a major portion of the hydraulic fluid to be diverted into the conduit 78. Thus, fluid flows through a portion of the conduit 84, through the motor 87, through the conduits 86, through a portion of the conduit 79, through the servo valve 67, and returns to the pump 72 through the conduit 75. The hydraulic motor 83 is thus driven at its maximum speed which advances the conveyor 36 and tray T of letters thereon toward the operator at the rate of approximately two feet per second. It is to be understood that the spool 76 of the flow divider 74 may be placed in intermediate positions and that the position of the spool 76 cooperates with the flow divider to not only determine the direction of flow but to also determine the rate of flow in either direction according to the pressure exerted on the sensing finger 61 by the letters.

When the first letter contacts the sensing finger 61, the valve core 77 is abruptly moved inwardly against the urging of the spring 96 causing a core portion 77b to close the conduit 79 and open the conduit 78 thus causing the motor 83 and conveyor 37 to be momentarily driven in a reverse direction. The conveyor will thereafter be moved forward and reverse in a flutter type action in minute increments until the foremost letter exerts a two to four ounce force against the sensing finger 61 which balances the force of the spring 96 and causes the valve core 77 to assume the central position shown in FIGURE 5. It is to be understood that the elapsed time from the moment of contact of the sensing finger 61 to the moment when the tray is at rest is too rapid to be perceptible and the oscillation of the tray cannot be visibly detected.

After the foremost letter has been removed from the tray T and placed on the associated easel 22, the tray moves forward one letter thickness until a two to four ounce force is again applied to the sensing finger 61. This procedure is repeated for each letter in turn.

The singulator 38 (FIGS. 4, 6, 7 and 8) picks up one letter at a time from the letter tray T, at a speed determined by the operator who is reading the address on a previously singulated letter, and places the letters on the easel 22.

The singulator 38 comprises a vacuum pickup head 101 mounted on the lower end of a vertical pickup arm 102. The pickup head 101 is moved along the path P (FIG. 8) in the direction indicated by the arrows thereon. The pickup arm 102 (FIG. 7) extends through a slot 103 in the lower wall 104 of a housing 106 and is reciprocated both horizontally and vertically by barrel cams 107, 108 and 109 in the housing 106.

The cams 107 and 108 are similarly shaped and are secured to horizontal shafts 111 and 112, respectively, which are journalled in side walls 113 and 114 of the housing 106, the shaft 112 being the power input shaft of the mechanism. A pair of horizontal L-shaped brackets 116 and 117 are secured to the wall 114 and support the cam 109 for rotation about the axis of a vertical shaft (not shown). The cams are timed to rotate together by a vertically extending shaft 118 having gears 119, 121, and 122 keyed thereon and meshed with gears 123, 124 and 126, respectively. The shaft 118 is journalled in the lower wall 104 and the upper wall 127 of the housing, and the gears 123, 126 and 124 are secured to the shafts 111, 112, and to the cam 109, respectively.

Horizontal guide shafts 131 and 132 are secured to the side walls 113 and 114 and slidably carry brackets 133 and 134. A cam follower 136 is journalled on the bracket 133 and is received in a cam groove 137 in the cam 107. A second cam follower 138 is journalled on the bracket 133 and is received in a horizontal cam groove 139 in the L-shaped bracket 116. The upper end of the pickup arm 102 is slidably received in a boss 141 secured to the bracket 133. Similarly, a cam follower 142 is journalled on the bracket 134 and is received in a cam groove 143 in the cam 108. A second cam follower 144 is journalled on the bracket 134 and rides in a horizontal cam groove 146 in the bracket 117. The lower end portion of the pickup arm 102 is slidably received in a boss 147 of the bracket 134. The cam grooves 137 and 143 are identical, accordingly, it will be recognized that rotation of the cams 107 and 108 will cause the brackets 133 and 134 and the pickup head 101 to reciprocate horizontally.

A vertical guide shaft 148 secured to the upper wall 127 and to the lower wall 104 of the housing 106 cooperates with a channel member 149 secured to the side wall 114 to guide a bracket 150 for vertical movement. A cam follower 151 is journalled on the bracket 150 and is received in a cam groove 152 in the vertical cam 109. A rectangular slide block 153 is also secured to the bracket 150 and is received in a horizontal groove 154 in a block 156 that is welded to the pickup arm 102. It will be recognized that rotation of the cam 109 causes vertical reciprocation of the pickup arm 102, and that the block 153 prevents rotation of the arm 102 while permitting sidewise movement of the pickup arm under the influence of cams 107 and 108.

The mechanisms 39 (FIGS. 4 and 6) for driving the letter singulator 38 is mounted on housing 106 by means of a bracket 156 and comprises a continuously driven motor 161 which is connected to an electrically controlled clutch 162 by a belt drive 163. The clutch 162 may be of the type known as a particle clutch wherein small steel particles are magnetically solidified to connect a drive member to a driven member. The clutch 162 is connected to an electrically controlled particle brake 164 by a belt drive 166, and the particle brake 164 is connected to the power input shaft 112 of the letter singulator 38 by a belt drive 167. It will be understood that, after the letter transporting conveyor has been brought to a stop, the particle clutch 162 is engaged and the particle brake 164 is disengaged to move the vacuum pickup head 101 through one complete stroke along the path P (FIG. 8). After the pickup head 101 has completed one stroke and has returned to its starting position as shown in FIGURE 4, the particle clutch 162 is deenergized and the particle brake 164 is energized to lock the singulator 38 in its inactive position. The operator then codes another letter on the easel 22 and causes the letter transporting conveyor 23 to move the singulated letter away from the picking head 101. After the conveyor 23 has again stopped, the above cycle is repeated. The circuitry for actuating the drive mechanism 39 in timed relation with its associated letter transporting conveyor 23 will be described hereinafter.

As mentioned previously, the foremost letter is gripped by the vacuum head 101, removed from the tray, and carried to a position closely adjacent the easel 22 as indicated in FIGURE 8. When the letter is within a quarter inch from reaching the easel 22, the vacuum is released and air pressure of about three or four p.s.i. blows the letter off the pickup head 101 onto the associated easel 22.

The flow of air and vacuum to the pickup head 101 is controlled by a spool valve 169 (FIGS. 6 and 9) which is mounted on the housing 106 and is actuated by a cam 171 which is secured to the shaft 112. A cam follower 172 rides along the periphery of the cam 171 and is journalled on one end of a lever 173 which is pivoted on a pin 174 secured to the housing 106. The core 176 (FIG. 9) of the valve 169 is connected to the other end of the lever 173 and is urged toward the left (FIG. 9) by a spring 177. An air supply conduit 178 is connected to a source of air at approximately three to four p.s.i. and to the body of the valve 169. A vacuum supply conduit 179 is connected to a source of vacuum and to the body of the valve 169. A Y-shaped conduit 181 connects the vacuum head 101 to the body of the valve 169 at two points.

The periphery of the cam 171 is provided with a large diameter portion 182 which holds the valve core 176 in a position to block all the conduits. A small diameter portion 183 of the cam 171 permits the spring 177 to move the valve core 176 to the left thereby connecting the vacuum supply conduit 179 to the discharge conduit 181. A lobe 184 disposed between the large and small diameter portions causes the valve core 176 to abruptly and momentarily move to the right (FIG. 9) thereby causing the air supply conduit to communicate with the conduit 181. It will be understood that the cam is timed with the movement of the pickup head 101 so that the head is connected to the vacuum source when the head is moving to the left and upwardly (FIG. 8). When the head 101 is at its uppermost position and the bottom of the letter is within a quarter inch from the easel 22, the valve core 176 (FIG. 9) is abruptly moved to the right causing air to blow the letter off the head 101 and onto the easel 22. Both the air and vacuum conduits are closed when the head 101 is moving downwardly and to the right as viewed in FIGURE 8.

One of the easels 22 is associated with each station A and extends from its station A past all of the letter transfer and stacking mechanisms 27 (FIG. 1). The easel receives the letters from its associated singulator 38 and supports the letters for intermittent movement past the reading and coding operator. The easel 22 (FIG. 11) is inclined forty-five degrees away from the operator to aid the operator in reading the letters, and is preferably formed of three elongated pieces, an upper L-shaped guide 186, an intermediate guide plate 187, and a lower S-shaped guide 188. An elongated slot 189 is defined between the guide 186 and plate 187 and receives letter-propelling lugs 191 of the associated letter transporting conveyor 23. A similar slot 192 is formed between the plate 187 and the S-shaped guide 188 and receives therein a portion of the letter transfer and stacking mechanism 27.

Each letter transporting conveyor 23 extends from its associated station A to a drive housing 194 (FIG. 1) at the far right of the apparatus 20. The conveyors 23 are identical except for their length and each includes an endless steel tape 196 (FIG. 6) which has a plurality of the equally spaced letter propelling lugs 191 secured to its inner surface. A plurality of short tape drive lugs 197 are secured to the tape between the lugs 191. The lugs 191 and 197 are received in cavities 198 in an idler pulley 199 at one end of the tape, and in cavities 198a in a drive pulley 201 (FIG. 12) at the other end of the tape. The idler pulley 199 and drive pulley 201 are keyed to shafts 202 and 203, respectively. The shaft 202 is journalled in a bracket 204 that is bolted to an upstanding member 205 of the frame 53 which in turn is connected to the housing 106 of the associated station A. Similarly, the shaft 203 is journalled in a bracket 206 that is bolted on the housing 194 (FIG. 1).

The drive lugs 191 on tape 196 are preferably spaced approximately fourteen inches apart so as to handle most standard size letters. The lower run of the tape 196 is disposed adjacent the slot 189 (FIG. 11) so that the letter drive lugs 191 project through the slot 189 in position to engage and drive the letters L toward the right as viewed in FIGURE 1.

Each of the conveyors 23 is intermittently driven by a drive mechanism 211 (FIG. 12) which is activated by the associated operator upon actuation of a spacer bar switch 212 (FIGS. 3 and 13) after he has finished reading the address on the letter and has operated the keyboard to subsequently cause the appropriate code markings to be placed on the letters by the printing unit 26. The maximum rate at which the letters can be driven by each conveyor is four letters per second.

The drive mechanism mechanism 211 (FIG. 12) for each conveyor 23 is substantially the same as the drive mechanism 39 (FIG. 6) of the singulator 38 and each mechanism 211 includes a continuously driven motor 213 (FIG. 12) that is connected to a particle clutch 214 by a belt drive 216. The particle clutch 214 is connected to a particle brake 217 by a belt drive 218. The particle brake 217 is connected to the drive shaft 203 by a belt drive 219 which includes a pulley 221 keyed to the shaft 203.

Each letter transport conveyor 23 (FIG. 6) and its associated singulator 38 (FIG. 4) are operated at a pace set by the operator assigned to that station A. Any suitable control circuit, such as the circuit 223 (FIG. 13), is provided to control the timed actuation of the conveyor 23 and singulator 38. Power is directed into the circuit 223 through main lines L1 and L2 and continuously drives the letter singulator motor 161 and the motor 213 of conveyor 23. When the operator has finished coding each letter, he closes the spacer bar switch 212 thereby energizing a relay R through a circuit which includes a double pole, normally closed timing switch 224 (FIGS. 12 and 13). Energization of relay R closes relay contacts R1 and R2 and opens contacts R3 and R4. Closing of relay contact R1 establishes a circuit which actuates the particle clutch 214 to drive the associated conveyor 23. Closing of the relay contact R2 establishes a holding circuit around the spacer bar switch 212. Opening of the contact R3 disengages the particle brake 217, and opening of relay contact R4 de-energizes a timing switch solenoid 225. De-energization of of the timing solenoid 225 permits a spring 226 to move a timing switch 227 (FIGS. 6 and 13) to a closed position.

The energization of the clutch 214 causes the drive shaft 203 (FIG. 12) to be rotated through 180° to advance its conveyor fourteen inches. After the shaft 203 has rotated 180°, one of two diametrically opposed pins 229 (FIG. 12) on the drive pulley 201 contacts and momentarily opens the switch 224. Opening of the switch 224 causes the relay R to become de-energized thereby closing contact R3 to energize the brake 217, closing contact R4 to energize the switch solenoid 225, and opening contacts R1 and R2 to de-energize the clutch 214 and break the holding circuit around switch 212. It will be understood that the brake 217 does not stop the shaft 203 abrutly but permits the shaft to rotate several degrees before bringing it to a gradual stop. Thus, the pin 229 advances past the switch 224, and permits the switch to return to its normally closed position. It will also be understood that the magnetic field of the switch solenoid 225 is not sufficient to open the switch 227 against the urging of the spring 226 without a mechanical assist soon to be described.

Power is then transmitted from main line L1, through the closed contact R3 through a lead 232, through the coil of a relay S, and through the closed timing switch 227. Energization of the relay S opens relay contact S2 to de-energize the brake 164, opens contact S3 to prevent energization of the conveyor clutch 214 upon a premature closing of the spacer bar switch 212, closes contact S4 to provide a holding circuit across contact R3, and closes relay contact S1 to energize the particle clutch 162. Energization of the clutch 162 drives the shaft 112 (FIG. 6) and the pickup head 101 through one complete cycle at which time the lobe 184 provides the necessary mechanical assist to open the switch 227. The switch 227 is then held in the open position by the energized timing switch solenoid 225. Opening of the switch 227 de-energizes the relay S thereby opening relay contact S1 to de-energize the clutch 162, closing the contact S2 to energize the particle brake 164, opening the contact S4 to break the holding circuit across relay contact R3, and closing the contact S3, so that another normal cycle of operation may proceed upon closing the spacer bar switch 212.

It will be understood that each conveyor 23 and associated singulator 38 are controlled independently of the others by one of several circuits identical to the circuits 223.

Since the drive lugs 191 (FIGS. 10 and 11) of each conveyor 23 are spaced apart a distance greater than the length of most of the letters advanced thereby, the letters tend to slide forward by inertia after the fast moving conveyor 23 has been stopped. If this sliding motion were permitted, the letters would engage their adjacent forward lug 191 causing damage to the letters. Accordingly, a plurality of letter arresting devices 236 are provided to prevent this occurrence. The arresting devices 236 extend at spaced intervals along the full length of each easel 22 and are positioned slightly upstream of the letter drive lugs 191 when the lugs 191 are stationary. A letter arresting unit 236 is provided for each conveyor 23 at each indexed position of the letters.

Each arresting unit 236 (FIGS. 10 and 11) includes an arm 237 pivotally mounted by a pin 238 to the body 239 of an air cylinder 241. A resilient pad 242 on the lower end of the arm 237 is arranged to be moved from an upper position spaced from the associated letter to a position in clamping engagement with the letter. The arm 237 is normally held in its upper position by spring 243 connected between the arm 237 and a pin 244 secured to an elongated mounting plate 246 to which the body 239 is secured. The air cylinder 241 has a piston 247 slidably mounted therein which is urged against a roller 248 carried by the arm 237 by a compression spring 249. An air supply conduit 251 is connected to the mounting plate 246 and communicates with the piston 247.

The conduit 251 is connected to an air valve 253 (FIG. 14) which has a core 254 that is operated by a solenoid 256. The arresting unit solenoid 256 is momentarily energized by the double pole timing switch 224 (FIG. 12) when one of the pins 229 engages the switch 224 and closes a circuit 257 (FIG. 13) having the solenoid 256 and switch 224 therein. The conduit 251 is normally vented to the atmosphere by a passage 258 in the core 254 which communicates with a port 259. When the conduit 251 is vented, the spring 243 holds the arm 237 in the solid line position (FIG. 11) When the solenoid 256 is momentarily energized in response to momentary actuation of the switch 224 by one of the pins 229 (FIG. 12), the core 254 (FIG. 14) is shifted so as to register an inclined passage 262 in the core with the conduit 251 and with a conduit 263 that is connected to a source of air under pressure. Thus, the arm 237 is momentarily moved downwardly to the dotted line position (FIG. 11) to resiliently clamp the letter between the pad 242 and the easel 22 to stop the letter.

It will be understood that each arresting device 236 is provided with one of the solenoid operated air valves and that all of the solenoid operated valves associated with one of the conveyors 23 are operated simultaneously in response to the actuation of the switch 224 associated with that conveyor.

As best shown in FIGURE 3, each operator controls the movement of one of the letter transporting conveyors 23 by means of the spacer bar switch 212 at a pace determined by that particular operator. At least two letters are within the range of vision of each operator to aid in his rapid reading of the address on each letter in turn. Upon reading the address on each letter the operator operates the proper keys on the keyboard to transmit certain coded information to the memory unit 25 (FIG. 22) and to the associated printing unit 26 which subsequently prints the code markings on the letter. The operator also actuates one of five keys which transmit a signal through the memory unit 24 to one of five letter transmitting and stacking mechanisms 27 (FIG. 1) which subsequently removes each letter from its easel 22 and stacks the letter with other letters in its particular classification or group.

The keyboard 24, the printing unit 26, and the decoding unit 28 (FIG. 2) of the decoding and letter sorting apparatus 21 may be of any suitable type and the details of the operating components form no part of the present invention. It is to be understood, however, that the printing units 26 are capable of printing three separate groups or rows of coded information on each letter and that the decoding units 28 are adjusted to scan a separate one of these three groups for each pass of the letters through the decoding and letter sorting apparatus 21.

The letter transfer and stacking mechanisms 27 are identical, therefore, the description of one will suffice for all. Each mechanims 27 includes a pair of parallel, vertically extending walls 266 and 267 (FIG. 15) upon which the several parts of the mechanisms 27 are mounted. A plurality of identical independently-operable kick-off devices 268 (FIGS. 15 and 16) are included in each mechanism 27, and each kick-off device 268 is associated with one easel 22 and its letter transporting conveyor 23. Since the kick-off devices 268 are identical, the description of one will suffice for all.

Each kick-off device 268 (FIGS. 15 and 16) includes a resilient roller 269 which is secured to a shaft 271 by end caps 272 and 273 (FIG. 15). The shaft 271 is continuously driven in a counterclockwise direction (FIG. 16) and is journalled in brackets 274 (only one being shown in FIG. 15). An elongate kick-off roller 276 which extends substantially the full length of the roller 269 is journalled on a rigid carrier 277 which is pivotally mounted at one end on a pin 278 (FIG. 15) and at the other end by a pin 281 (FIG. 21). The pins 278 and 281 are each secured to the housing 282 of one of two identical air cylinders 283 that are suitably supported by the adjacent brackets 274.

The rearward end of each housing 282 is closed by a plate 284 (FIG. 16). A piston 285 is slidably received in the housing 282 and has a reduced diameter central portion 286 having a diametrical passage 287 extending therethrough. An axially extending passage 288 communicates with the passage 287 and projects through the end of the piston 285 adjacent the closure plate 284. A bore 289 in the forward end of the piston 285 receives one end of a pin 291. The other end of the pin 291 is received in a cavity 292 formed in the carrier 277. An air supply conduit 293 is connected between a solenoid operated air valve 294 and a port 296 in the housing 282 which port 296 communicates with the reduced diameter portion 286 of the piston 285. The air cylinder 283 is suitably supported by the wall 266. An elongated, inclined letter guide plate 297 cooperates with the S-shaped guide 188 of the easel 22 to control the discharge of letters from the easel 22.

Each carrier 277 and its kick-off roller 276 are normally held in a retracted position below the letter supporting surface of the easel 22 as indicated at the left in FIG. 16 by springs 298 connected between the carrier 277 and the housings 282 of the adjacent air cylinder 283. When high pressure air is directed into the air cylinder 283, the roller 276 is moved through the slot 192 in the easel 22, as indicated at the right in FIG. 16, thereby forcing the letter L against the continuously moving roller 269 causing the letter to be discharged between the guide plate 297 and the S-shaped guide 188 of the easel 22.

The solenoid operated valve 294 (FIG. 17) comprises a body 301 having a slidable core 302 therein. The core 302 is normally held in the inactivated position shown in FIG. 17 by a spring 303. When in the inactivated position, the conduit 293 is vented to the atmosphere through a passage 304 in the core 302 which registers with the conduit 293 and with a port 306. The core 302 is connected to a solenoid 307 which moves the core 302 to the left when energized so that an inclined passage 308 in the core 302 will register with the conduit 293 and with a conduit 309. The conduit 309 is connected to a source of air under pressure. Thus, when the solenoid 307 in energized, high pressure air is directed into the air cylinder 283 thereby forcing the kick-off roller 276 against the letter L and the letter L against the continuously driven roller 269 which discharges the letter from the easel 22.

As indicated in FIGURE 18, the rollers 269 of the kick-off devices 268 are driven by a motor 312. The motor 312 is connected to a main line shaft 313 by a belt drive 314. The main line shaft 313 is arranged to drive all the rollers 269 associated with the longest letter transporting conveyor 23 shown in FIGURE 1 by means of one or more belt drives 316 (FIG. 15). Other line shafts 317 are provided for driving all the rollers 269 associated with the other letter transporting conveyors 23. The line shafts 313 and 317 are interconnected by belt drives 318 and each line shaft 317 is connected to its group of rollers 269 by one or more belt drives 319. It will be understood that the motor 312 is disposed within the housing 194 (FIG. 1) and that the line shafts 313 and 317 are suitably journalled and extend transversely through all the letter transfer and stacking mechanisms 27. The shafts 271 upon which the rollers 269 are secured, may be long shafts extending through all the transfer mechanism 27, in which case only one belt drive 316 or 319 is required for each line shaft. If it be desired that the shafts 271 extend across only one of the mechanisms 27, then several belt drives 316 or 319 will be required for each line shaft.

Upon receipt of a signal from the memory device 25, the solenoid valve 294 (FIG. 15) actuates the associated kick-off roller 276 and transfers the letter from the easel 22 to the stacking conveyor 321 of the associated letter transfer and stacking mechanism 27.

As mentioned previously, each mechanism 27 is separated from its adjacent mechanism by walls 266 and 267. Accordingly, these walls serve to guide each stacking conveyor 321 along its path of movement indicated in FIG. 18. Each conveyor 321 comprises two parallel endless chains 322 (FIG. 15) having a plurality of evenly spaced transversely extending bars 323 secured therebetween. Each bar 323 supports a plurality of spaced L-shaped fingers 324 which cooperate to define a letter carrying bucket 326. As best shown in FIGURE 16, the trailing edges 324a of the finger 324 which define one bucket 326 extend outwardly further from the chains 322 than do the hooked ends 324b of the fingers 324.

The chains 322 of each stacking conveyor 321 are trained around pairs of sprockets 327, 328, 329 and 331, only one sprocket of each pair being shown in FIGURE 18. The pairs of sprockets 327, 328, 329 and 331 are keyed on shafts 332, 333, 334 and 336, respectively, which shafts are suitably journalled in the walls 266 and 267. The shafts 332, 333, 334, and 336 are preferably long enough to extend through all the letter transfer and stacking mechanisms 27. It should be understood, however, that separate short shafts for each mechanism 27 may be used if desired.

The stacking conveyor 321 of each letter transfer and stacking mechanism 27 is continuously driven by a motor 337 which is connected to a line shaft 338 journalled on the frame of the apparatus 20 by a chain drive 339. The line shaft 338 is connected to the shaft 332 by a chain drive 341 which drives the conveyors 321 in the direction of the arrow in FIGURE 18 and at a rate of approximately twenty-eight inches per second.

The buckets 326 of each conveyor 321 receive one or more letters from the kick-off devices 268 associated therewith and move the letters down an inclined run 344 of the conveyor 321. The letters are combed out of the buckets 326 by fingers 346 (FIGS. 18 and 19) which project between the fingers 324 which form the buckets 326. The fingers 346 are formed on the forward end of a plate 346a, which is secured to a tray supporting frame 347 which is pivotally connected at one end of the adjacent walls 266 and 267. The other end of the frame 347 is pivotally supported by a crank arm 348 which is journalled on an eccentric 349 keyed to the drive shaft 351 of a motor 352. The motor 352 is continuously driven at approximately 1750 revolutions per minute and the eccentric 349 causes the discharge end of the frame 347 to vibrate at an amplitude of approximately $\frac{1}{16}$ of an inch.

A tray T with its forward end plate removed is placed on the frame 347 with the upper surface of its floor 353 disposed and even with or slightly below the rear end of the plate 346a so that the letter may slide into the tray T. The frame 347 is so constructed that one side edge of the tray is lower than the other side edge. Accordingly, all of the letters will gravitate to the low side so that one side edge and the bottom edge of each letter will be in common planes with the corresponding side edges and bottom edges of all other letters.

In order to prevent the letters from falling flat onto the plate 346a and skidding to the closed end of the tray T immediately after they have been combed from the buckets 326, a pair of shallow abutment strips 354 and 356 (FIG. 19) are secured to the upper surface of the plate 346a. It will be appreciated that the strips 354 and 356 hold the letters upright and that the letters accumulating rearwardly of the strips will gradually force the forward letters over the strips 354 and 356. The slowly advancing letters then tend to flatten to some extent but the inclination of the frame 347 is insufficient to cause them to lose their shingled or overlapping relationship. As the tray T fills, the letters are moved to a more nearly vertical position as indicated in FIGURE 18.

When the tray has been filled, an operator closes a switch 358 to energize a solenoid 359 which is secured to a bracket 360 secured to the frame 347. A plurality of fingers 361 are carried by the actuating element 359a of the solenoid 359 and are moved upwardly through openings 362 in the plate 346a when the solenoid 359 is energized. The fingers 361 project upwardly between the letters being stacked to act as abutments which prevent incoming letters from moving downstream of the fingers 361. The operator then collects all the letters downstream of the fingers 361 and moves them into the tray T and thereafter inserts the other end plate into the tray. The operator then removes the filled tray from the frame 347 and places an empty tray thereon, thereby actuating a switch 364 which de-energizes the solenoid 359.

As shown in FIGURE 20, the solenoid 359 is connected in series with the switches 364 and 358 to main lines L1 and L2. The switch 358 is of a ratchet operated type which is normally closed and is momentarily opened only when its actuating element is being moved downwardly between an upper position when not contacting a tray to the lower position shown in FIGURE 18. When the operator closes the switch 358 the solenoid 359 and a relay 366 are energized. The energization of the relay 366 establishes a holding circuit across the switch 358 by closing relay contact 366a. The solenoid 359 and relay 366 are de-energized by momentary opening of the switch 364 in response to the placement of an empty tray on the actuating element of the switch 364. De-energization of the relay momentarily opens the relay contact 366a thereby breaking the holding circuit.

Since the reading, coding and presorting apparatus 20 (FIG. 1) is operator-paced, i.e., since each coding operator controls the actuation of his letter transporting conveyor 23 independently of the other operators, and since the letters from all the operators are kicked-off onto continuously driven stacking conveyors common to all the operators, a timing device 370 (FIG. 21) is provided to assure that the letters are kicked-off at the proper instant.

The timing device 370 comprises a disc 371 secured to the shaft 334 of the stacking conveyors 321. Three permanent magnets 372 are secured at evenly spaced intervals to the periphery of the disc 371. A reed switch 373 is positioned closely adjacent the path of movement of the magnets and includes a stationary contact 374 and a movable ferrous contact 376. The magnets 372 are oriented relative to the buckets 326 of the stacking conveyors 321 so that one of the magnets 372 moves past the switch 373, thereby moving the contact 376 against the contact 374, at the precise moment the kick-off rollers 276 of the several kick-off devices 268 should be actuated. The reed switch 373 (FIG. 22) is placed in series with all the solenoids 307 (only four being shown in FIG. 21) which causes actuation of the kick-off rollers 376.

It will be understood that not all the solenoids 307 will be actuated upon closing of the reed switch 373 but that only those solenoids 307 which receive a signal from the memory unit 378 will be actuated.

As indicated diagrammatically in FIGURE 22, coded information from the keyboards 24 is transmitted to the memory unit 25. Certain of this information is transmitted to the printing units 26 which subsequently print the coded information on the letters. Other information or signals pertinent to the five presor groups are transmitted by the memory unit 25 to certain preselected ones of the solenoids 307 so that each letter will be kicked-off at the correct time into the proper stacking conveyor 321 as determined by the closing of the reed switch 373.

The memory device 25 may be of the type disclosed in the patent to Broido No. 2,892,542. In modifying the Broido memory device for use with the keyboard 24 and the solenoid-controlled, air-actuated kick-off rollers 276, a rotary memory drum 380 (FIG. 23) would be provided to control the discharge of letters moving along each letter transporting conveyor 23. Thus, if there are ten such conveyors, there will be ten separate memory drums. Each drum 380 is driven in timed relation with the associated conveyor 23 and with a timing cam 382 which has a plurality of lobes 383, each lobe being associated with one row 385 of a plurality of rows of spools 387 mounted on the periphery of drum 380. Each spool 387 is arranged to move laterally in its row from a normal position in which it will not actuate and close a switch 390 during subsequent movement of the spool by the drum to a position in which it will actuate the switch. Each spool is selectively moved laterally in its row by means of an actuating arm 392 that has a hub disposed on a shaft 393, each arm having an outer end adapted to move upwardly and engage a camming surface on the spool to shift it laterally. The hub of the arm 392 is in frictional engagement with the shaft 393 and is connected by a key 395 (FIG. 24) that is somewhat smaller than the keyway in the shaft. A pawl 396 is normally spring-urged into engagement with a tooth on the hub of arm 392 so that normally the arm cannot move upward when the shaft 393 is rotated clockwise. During operation, the shaft 393 is periodically rotated clockwise by the timing cam 382 through a lever 398 and an arm 399 keyed to shaft 393. A spring 400 holds a cam follower roller on the lever 398 in engagement with the timing cam. When the pawl is released, in a manner to be described presently, and the shaft 393 is rotated slightly by the timing cam, the frictional engagement of shaft 393 with the arm, plus the action of a spring 401, swings the arm upwardly to engage and deflect the spool. The arm is later moved out of engagement with the spool due its keyed connection to shaft 393 which is rotated counterclockwise by spring 400.

As previously mentioned, when a spool has been shifted laterally it will engage and close a switch 390 that is in the circuit of one of the solenoids 307 which, when energized, actuates the associated kick-off mechanism.

To direct a letter to a particular one of the five stacking mechanisms 27 the operator pressed the particular button of five buttons on this keyboard 24 that is associated with that stacking mechanism. As shown diagrammatically in FIGURE 23, downward movement of the button will close a switch 403 in the circuit to a solenoid 404 that is operatively connected to the one of the pawls 396. When the solenoid is energized and the pawl is moved out of engagement with the hub of the associated arm 392, the arm will be swung upwardly the next time the shaft 393 is rotated by the timing cam. Accordingly, depression of a particular button causes a particular spool to actuate one of the switches 390 to energize a solenoid 307 and actuate the associated kick-off mechanism.

It will be noted that each of the five switches 390 is associated with only one spool of each row of spools, and that the five switches are disposed in stepped formation since each intermittent movement of the drum corresponds to the intermittent movement of the letter by the associated conveyor 23 a distance equal to the width of one of the kick-off mechanisms.

In FIGURES 23 and 24 a schematic showing of a memory unit is presented, however, it is to be understood that reference may be had to the above-mentioned Broido Patent 2,892,542 for details of construction and operation and for alternate equivalent arrangements of the mechanisms.

As mentioned previously, the components of the decoding and letter sorting apparatus 21 (FIG. 2) are substantially the same as the components of the reading, coding and presorting apparatus 20 (FIG. 1). Accordingly, parts of the apparatus 21 which are similar to those of the apparatus 20 will be assigned the same numerals followed by the suffix "a." The primary differences between the two apparatus being that the apparatus 21 includes the decoding units 28 (FIGS. 2 and 2A) which decode the information printed on the letters by the printing units 26 (FIG. 3) of the apparatus 20. The decoded information corresponding to each letter is transmitted to a memory unit 381 which stores the information until the letter reaches the preselected letter transfer and stacking mechanism 27a at which time the signal is transmitted to the proper solenoid 307a which causes the letter to be kicked-off its transporting conveyor 23a into the proper letter transfer and stacking mechanism 27a.

The memory unit 381 may be substantially identical to the unit 25 shown in FIGURES 23 and 24. It will be recognized however that each of the pawl-actuating solenoids associated with the 64 kick-off mechanisms of machine 21 will be energized when it receives an appropriate signal from the decoder 28 rather than from a button that has been actuated on the keyboard. Also, it is evident that the memory unit 381 must be made large enough to process 64 kick-off mechanisms.

The decoder 28 may be of the type disclosed in United States Letters Patent of John Perrin, No. 2,669,354. This decoder includes a projector for directing a beam of light onto each letter and a plurality of tubes which receive light reflected from the letter and direct it to a photoelectric unit which will send a signal to one of the pawl-actuating solenoids 404. The characteristics of the light reflected from a letter will, of course, depend upon the code imprinted thereon by the code printing unit 26 at the operator's station of machine 20.

Another difference between the two apparatus 20 and 21 is that the conveyors 23a of the apparatus 21 are all intermittently driven simultaneously by a Ferguson drive unit 410 (FIG. 2B) which is enclosed in a housing 414 shown at the far right of FIGURE 2. The Ferguson drive unit 410 is driven by a motor 416 through a belt drive 417. The Ferguson drive unit 410 is connected to a line shaft 518 by a flexible coupling 419. The drive pulleys 201a of the conveyors 23a are keyed on the shaft 418. The Ferguson drive unit 410 intermittently drives the pulleys 201a at the rate of four cycles per second.

The circuit 223a (FIG. 2A) for controlling the intermittent drive mechanisms 37a for each singulator 38a is similar to but slightly modified relative to that shown in FIGURE 13. The circuit 223a has the continuously driven conveyor motor 416 and singulator motors 161a connected in parallel across main lines L1a and L2a. The conveyor actuated timing switch 224a normally closes a circuit which energizes relay Ra to hold contact R4a closed. Closed contact R4a maintains timing switch solenoil 225a energized to hold the cam actuated singulator switch 227a open. The spring 226a tends to close the switch 227a which is in a circuit having relay Sa therein. Relay Sa has a normally open contact S1a in series with the clutch 162a. Relay Sa also has a normally closed contact S2a which is in series with the brake 164.

Immediately prior to the completion of each intermitten movement of the conveyor 23a, the switch 224a (FIG. 2B) is momentarily opened and thereafter returns to the closed position. Opening of the switch 224a momentarily energized the solenoid 256a to actuate the letter arresting devices and momentarily de-energizes relay Ra to open contact R4a and de-energizing timing switch solenoid 225a allowing spring 226a to close switch 227a. Closing of the switch 227a energizes relay Sa thereby closing contact S1a and opening contact S2a to energize each clutch 162a and de-energize each brake 164a. As the singulators complete one cycle, the switch 227a is mechanically opened against the urging of spring 226a and is held in the opened position by the timing switch solenoid 225a. The cycle is repeated for each intermittent motion of the conveyors 23a.

Although the operation of the different components have been included with their description, a resume of the over-all operation of the letter handling system will follow.

Letters to be processed by the system are manually presented to the reading, coding and presorting apparatus 20 (FIGS. 1 and 3) in trays which contain up to approximately fixe hundred letters with all the addresses facing the operators. The trays are placed on the tray conveyors 36 which advance the trays toward the associated singulators 38 at a maximum rate of approximately two feet per second until the foremost letters contact their associated letters sensing fingers 61. The tray conveyors 36 then advance the trays forward in increments of single letter thicknesses as the letters are removed from the tray T and are placed on the associated easel 22 by the associated singulator 38.

The speed of operation of the letter transporting conveyor 23 and the singulator 38 at each station A is determined by the rate at which the operator at that station codes the letters. As each letter appears in front of the operator, he reads and translates the address into strokes on the keyboard 24 to send appropriate signals to the electronic directory and memory unit 25 (FIG. 22). Upon completion of the coding, the operator at each station A actuates his spacer bar switch 212 to first advance the letters one step and then activate the singulator to place the next letter on the associated easel 22. Output signals from the directory and memory unit 25 control the imprinting of a code on each letter and the selection of the appropriate letter transfer and stacking mechanism 27 for each letter. Each mechanism 27 receives all letters of a preselected classification from all of the letter transporting conveyors 23.

The letter transfer and stacking mechanisms 27 stack each group of letters in trays T. The trays from each preselected classification, in turn, are then manually removed from the reading, coding and presorting apparatus 20 and are placed in the decoding and letter sorting apparatus 21 (FIG. 2). The letters are handled by the eight singulators 38a and eight letter transporting conveyors 23a of the apparatus 21 at the rate of four cycles per second.

The decoding units 28 associated with the conveyors 23a "read" the code printed on each letter and transmits a corresponding signal to the memory unit 381 which signals the appropriate one of sixty-four letter transfer and stacking mechanisms 27a, which removes the letter from the associated conveyor 23a and stacks the letter with other letters in its classification in trays.

The letters in each classification may be processed through the apparatus 21 three times if such extensive sorting is required. For each successive pass through the apparatus 21, the decoding unit 28 is shifted one "field" to read a new array of coded material on the letter to correspond to a first, second or third automatic sort. While more passes are possible, three passes are more than adequate to satisfy most sorting requirements. One pass through the apparatus 20 and three passes through the apparatus 21 sort the letters into 1,310,720 classifications at the rate of approximately 100,100 letters per hour.

Although letters have been referred to throughout the specification and claims as the articles being sorted, it is to be understood that other relatively flat articles, such as file cards, punch cards, and checks may be processed through the system. Accordingly, in the following claims, the term "letter" will be used generically to indicate any relatively flat, data-bearing member.

While one embodiment of the present invention has been shown and described, it will be understood that various changes and modifications may be made without departing from the spirit of the invention or the scope of the appended claims.

Having thus described the present invention and the manner in which the same is to be used, what is claimed as new and is desired to be protected by Letters Patent is:

1. An apparatus for handling data bearing articles such as letters comprising a tray conveyor for advancing a tray of letters along a predetermined path, an elongate horizontal letters supporting easel extending transversely of said tray conveyor and having an elongate slot therein, one end of said easel being disposed adjacent said tray conveyor, singulating means adjacent said one end of said easel for removing one letters at a time from said tray and placing said letter directly on said one end of said easel, a letter advancing conveyor extending parallel to said easel and disposed closely adjacent thereto, a plurality of evenly spaced drive lugs on said letter conveyor extending through said slot into position to contact one edge of each letter placed on said easel, drive means for intermittently driving said singulator to advance singulated letters out of and away from said tray, and drive means connected to said tray conveyor and responsive to the removal of a letter from said tray for advancing said tray a distance equal to the thickness of the letter removed therefrom.

2. Apparatus for sorting articles such as letters comprising a bank of parallel, individual endless letter transport sorting conveyors, said transport conveyors being of progressively shorter lengths, the longest conveyor of the bank being at the far side of the bank, each of the remaining conveyors in the bank being shorter than the conveyor immediately behind it, the input ends of the conveyors being progressively staggered, with the input end of all but the longest conveyor of the bank being disposed downstream of the input end of the conveyor immediately behind it in the bank, means for driving said transport conveyors; a generally horizontal letter tray conveyor at the input end of each of the individual transport conveyors, each tray conveyor running substantially at right angles to its associated transport conveyor and projecting outwardly from both sides thereof, letter trays in said tray conveyors; a singulator at the intersection of each tray conveyor and the input end of the associated transport conveyor for removing letters individually from the trays in the tray conveyors and depositing them directly on the associated transport sorting conveyor, means for driving said singulators in synchronism with their associated transport conveyors; a plurality of stacking conveyors downstream of the input end of the shortest transport conveyor, each stacking conveyor representing a single destination and comprising an endless belt mounting a plurality of letter carrying buckets, the upper reach of each belt passing directly beneath all of said transport conveyors, said belts running substantially normal to said transport conveyor, each stacking conveyor including letter receptacle means and means for removing letters from the buckets and feeding them to said receptacle means, means for driving said stacking conveyor belts in synchronism with said letter transport conveyors; and remotely controllable letter diverting means at the intersection of each transport conveyor with each stacking conveyor belt, for diverting letters from the transport conveyors to the buckets of said stacking conveyor belts.

3. The apparatus of claim 2, wherein said stacking conveyor letter receptacle means includes a letter receiving platform, and a removable letter receiving tray on said platform.

References Cited by the Examiner

UNITED STATES PATENTS

| | | | |
|---|---|---|---|
| 2,467,113 | 4/1949 | Deiters | 214—152 |
| 2,529,777 | 11/1950 | McInnis | 198—135 |
| 2,571,579 | 10/1951 | Jones. | |
| 2,616,574 | 11/1952 | Johanson. | |
| 2,652,161 | 9/1953 | Herzig. | |
| 2,689,657 | 9/1954 | Lens | 214—11 |
| 2,709,012 | 5/1955 | Lessard | 214—152 |
| 2,809,744 | 10/1957 | Hapman | 198—203 |
| 2,812,079 | 11/1957 | Carnine | 214—11 |
| 2,925,926 | 2/1960 | Packman | 214—7 |
| 2,943,726 | 7/1960 | Granath | 198—135 |
| 2,943,751 | 7/1960 | Gartner. | |
| 2,992,725 | 7/1961 | Poundstone | 198—203 |
| 3,051,332 | 8/1962 | Richert | 214—7 |
| 3,062,391 | 11/1962 | Francois | 214—11 |
| 3,071,261 | 1/1963 | Fisher | 214—11 |
| 3,103,285 | 9/1963 | Goodell | 214—11 |

FOREIGN PATENTS 632,403    11/1949    Great Britain.

HUGO O. SCHULZ, *Primary Examiner.*

MORRIS TEMIN, *Examiner.*